(12) United States Patent
Campisi

(10) Patent No.: US 7,775,234 B2
(45) Date of Patent: Aug. 17, 2010

(54) VALVE-TO-FITTING CONVERTER FOR PROCESS PIPING SYSTEMS

(76) Inventor: Marc Wyler Campisi, 2995 Woodside Rd., Woodside, CA (US) 94062

( * ) Notice: Subject to any disclaimer, the term of this patent is extended or adjusted under 35 U.S.C. 154(b) by 347 days.

(21) Appl. No.: 12/018,394

(22) Filed: Jan. 23, 2008

(65) Prior Publication Data

US 2009/0183787 A1   Jul. 23, 2009

(51) Int. Cl.
*F16K 15/00* (2006.01)
*F16K 11/20* (2006.01)
(52) U.S. Cl. .............. 137/269; 137/561 A; 137/315.01; 137/597
(58) Field of Classification Search .............. 137/515.7, 137/597, 315.01, 269, 270, 561 A; 138/37, 138/39; 251/331
See application file for complete search history.

(56) References Cited

U.S. PATENT DOCUMENTS

| | | | | |
|---|---|---|---|---|
| 3,275,292 A | * | 9/1966 | Boteler | 251/331 |
| 5,005,428 A | * | 4/1991 | Tanis | 138/39 |
| 6,155,535 A | * | 12/2000 | Marcilese | 251/331 |
| 6,575,431 B2 | | 6/2003 | Artsvelyan | |
| 6,761,184 B1 | * | 7/2004 | Jordan | 137/270 |
| 7,063,098 B2 | * | 6/2006 | Sprague | 137/15.04 |
| 7,273,072 B2 | * | 9/2007 | Muller | 137/885 |

* cited by examiner

*Primary Examiner*—Kevin L Lee
(74) *Attorney, Agent, or Firm*—Edward S. Wright

(57) ABSTRACT

Valve-to-fitting converter that mounts on the body of an existing valve in a piping system in place of the actuator for the valve and has a dam that mates with a weir in the valve body to block flow between sections of piping connected to the valve body, and ports that provide communication between the sections of piping and fittings connected to the converter. With such converters replacing two or more of the valves in a system, sections of piping can be isolated and/or re-routed without having to shut down the entire system for an extended period of time.

20 Claims, 8 Drawing Sheets

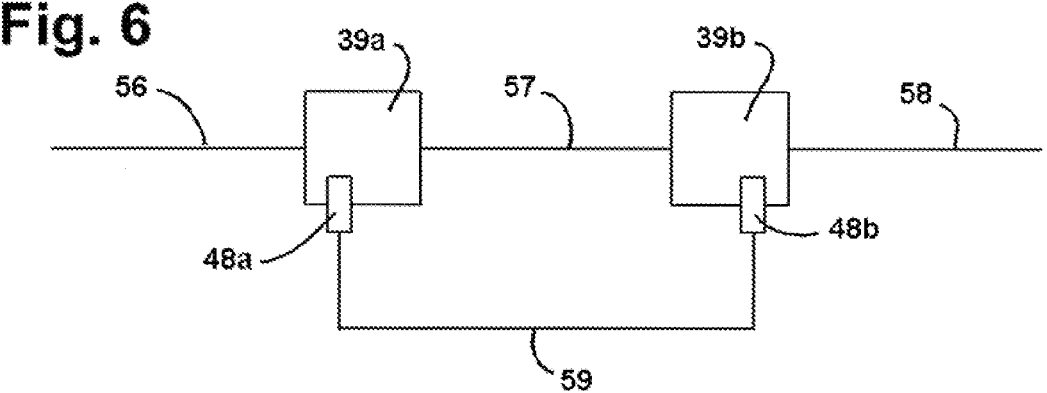
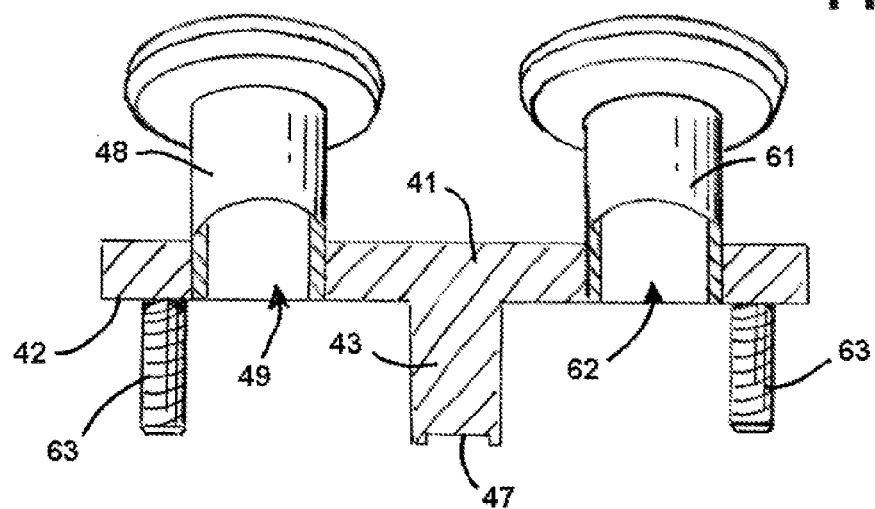
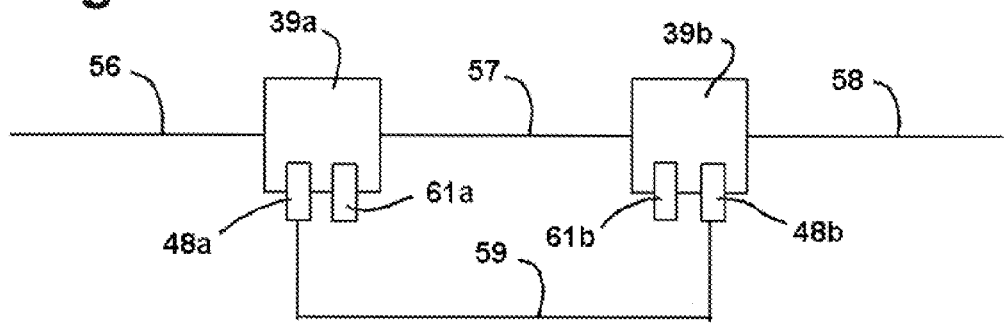

VALVE-TO-FITTING CONVERTER FOR PROCESS PIPING SYSTEMS

BACKGROUND OF THE INVENTION

1. Field of Invention

This invention pertains generally to piping systems and, more particularly, to a converter that can be mounted on the bodies of existing valves for isolating and/or re-routing sections of a system without shutting down the entire system for an extended period of time.

2. Related Art

Piping systems such as sanitary process piping systems commonly used in industries such as the biotechnology, pharmaceutical, dairy, food, and beverage industries typically include components such as tanks, pumps, fermenters, filter assemblies and processing stations which are interconnected by sections of piping and flow control valves.

One type of valve that is widely used in such systems is a weir-diaphragm valve having a body that is connected to the piping and an actuator that is removably mounted on the body. Flow between the sections of piping connected to the body is controlled by a diaphragm that can be moved into and out of engagement with a weir in the valve body by the actuator.

Such systems sometimes need to be shutdown for operations such as cleaning, passivation, maintenance, repair, and/or modification, and having an entire system off line for an extended period of time can be both disruptive and costly. It can also be necessary to clean and/or passivate an entire system when only a portion of the system actually needs it.

OBJECTS AND SUMMARY OF THE INVENTION

It is in general an object of the invention to avoid having to shut down entire piping systems for extended periods of time by providing a valve-to-fitting converter that mounts on the bodies of existing valves and permits sections of a system to be re-routed and/or isolated for cleaning, passivation, maintenance, repair, and/or modification while the remainder of the system remains in operation.

Another object of the invention is to provide a valve-to-fitting converter of the above character which is particularly suitable for use in sanitary process piping systems.

These and other objects are achieved in accordance with the invention by providing a valve-to-fitting converter that mounts on the body of an existing valve in a piping system in place of the actuator for the valve and has a dam that mates with a weir in the valve body to block flow between sections of piping connected to the valve body, and ports that provide communication between the sections of piping and fittings connected to the converter.

With such converters replacing two or more of the valves in a system, sections of piping can be isolated and/or re-routed without having to shut down the entire system for an extended period of time.

BRIEF DESCRIPTION OF THE DRAWINGS

FIG. 6 is a schematic diagram of a portion of a piping system in which valve-to-fitting converters of the type shown in FIG. 3 are used in bypassing a section of the piping.

FIG. 7 is a cross-sectional view of another embodiment of a valve-to-fitting converter according to the invention.

FIG. 8 is a schematic diagram of a portion of a piping system in which valve-to-fitting converters of the type shown in FIG. 7 are utilized.

DETAILED DESCRIPTION

Figure 1:
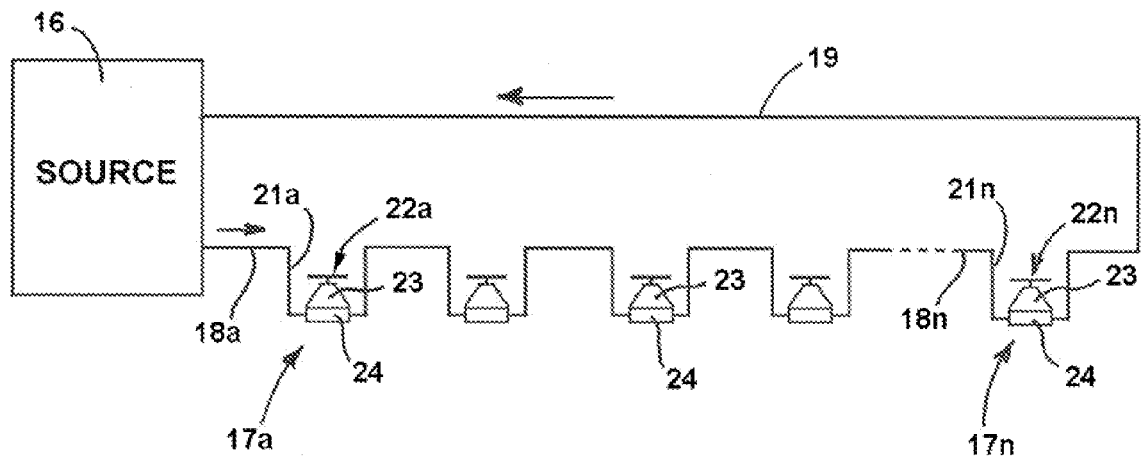
FIG. 1 is a schematic diagram of one embodiment of a sanitary process piping system in which the valve-to-fitting converter of the invention can be utilized.

The system illustrated in FIG. 1 includes a still or source 16 which supplies highly purified water or water for injection (WFI) to a plurality of stations 17a-17n that are connected together in a loop with the still by piping sections 18a-18n and a return line 19. Each station includes a pipe drop 21a-21n and a valve 22a-22n. In a sanitary process piping system such as this, the piping is typically stainless steel, and the valves are typically weir-diaphragm valves having valve actuators 23 removably mounted on valve bodies 24. The valves can be of conventional design, and the actuators can be of any suitable type, including those which are manually, pneumatically or electrically actuated. The actuators are removably mounted on the valve bodies and are typically secured to the bodies by screws or bolts.

Figure 2:
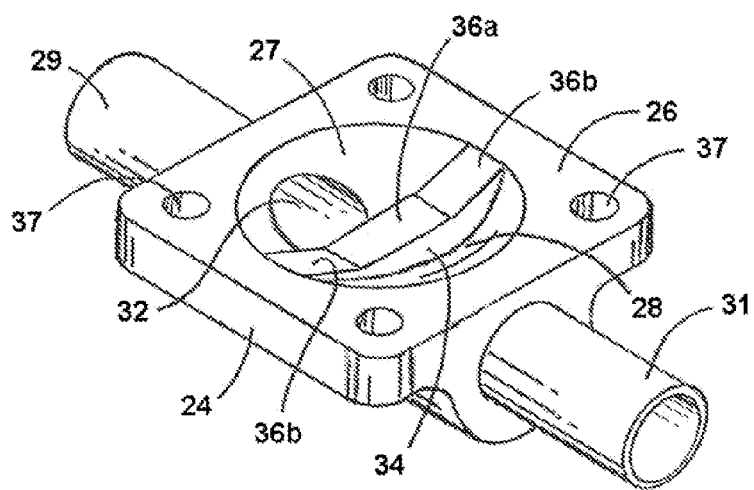
FIG. 2 is an isometric view of the body of a weir-diaphragm valve in the system of FIG. 1.

As illustrated in FIG. 2, each of the valve bodies has a mounting surface 26 on which the valve actuator (not shown) is normally mounted, a pair of chambers 27, 28 which open through the mounting surface, and connector stubs 29, 31 which extend in opposite directions from the body and communicate with respective ones of the chambers through ports 32, 33. A weir 34 disposed between the chambers is engagable by a diaphragm in the actuator to block flow between pipe sections connected to the stubs. In this particular embodiment, the weir has a generally concave outer surface or face 36 with a generally planar central section 36a that is recessed inwardly from and parallel to mounting surface, and outer sections 36b, 36b that extend between the ends of the central section and the mounting surface and are inclined at an angle to the mounting surface. Holes 37 near the corners of the mounting surface receive the mounting bolts that secure the actuator to the valve body.

Figure 3:
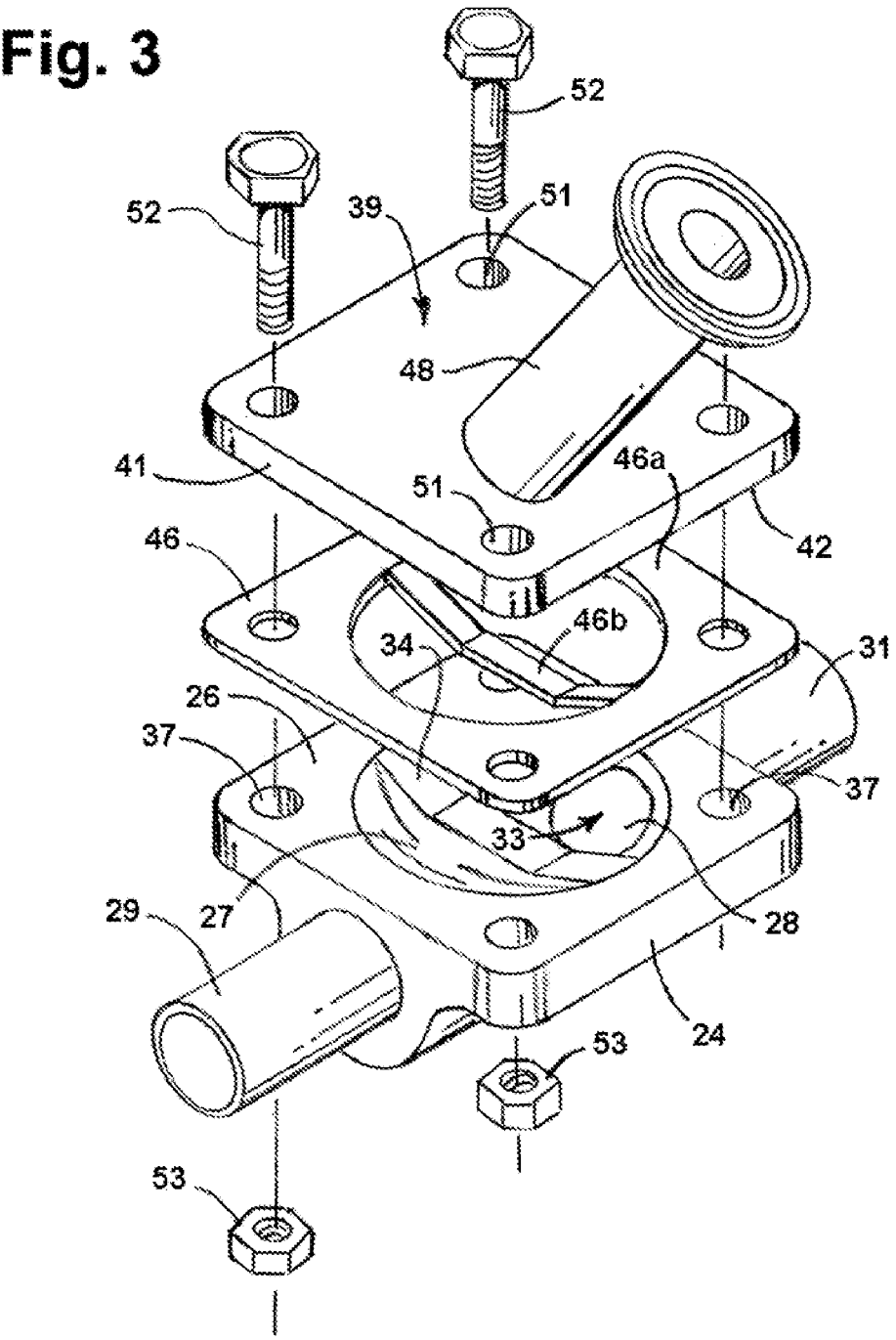
FIG. 3 is an exploded isometric view of one embodiment of a valve-to-fitting converter according to the invention in association with the valve body of FIG. 2.
Figure 4:
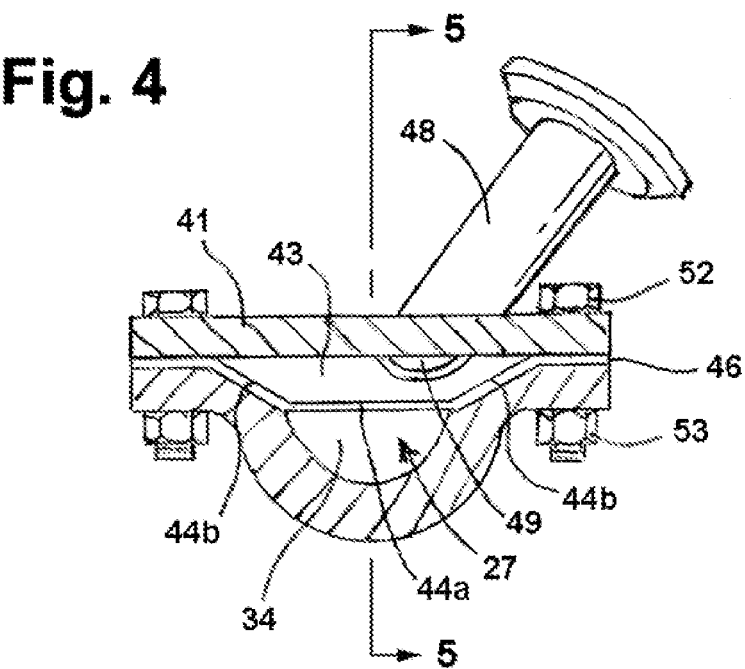
FIG. 4 is a cross-sectional view of the valve-to-fitting converter of FIG. 3 mounted on the valve body.
Figure 5:
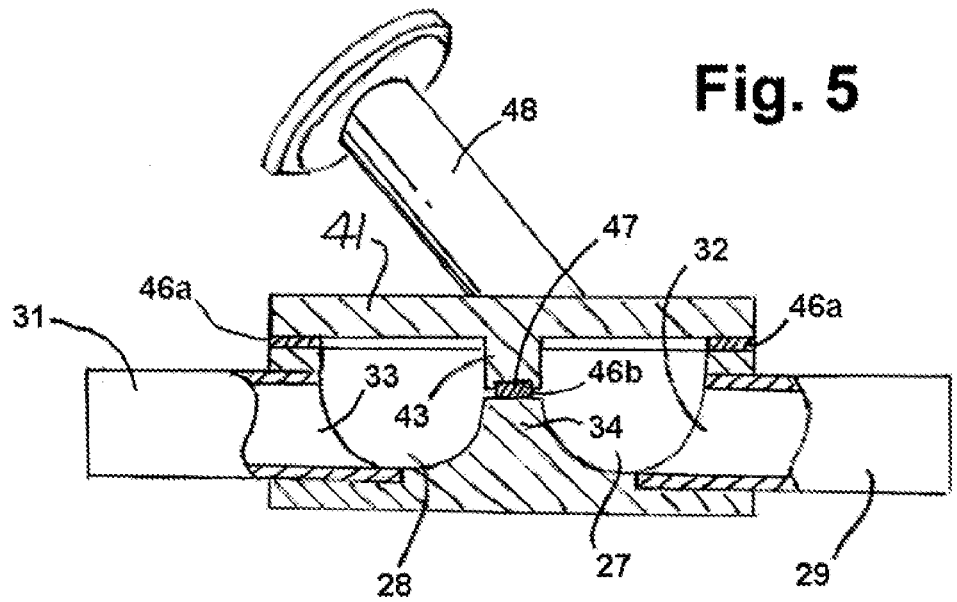
FIG. 5 is a cross-sectional taken along line 5-5 in FIG. 4.

FIG. 3 illustrates the installation of a valve-to-fitting converter 39 on valve body 24 where the actuator would normally be mounted. The converter has a base 41 with a planar sealing surface 42 on its inner or under side facing the mounting surface of the valve body. A dam 43 extends from the inner or under side of the base and mates with weir 34 to block communication between the chambers in the valve body. The dam has a generally convex surface or face 44 with a generally planar central section 44a and inclined outer sections 44b, 44b corresponding to the central and outer sections of the weir.

A gasket 46 is disposed between the converter and the valve body to form a seal between the two. The gasket has an outer peripheral portion 46a that surrounds the chambers and a central bridge portion 46b that separates them. The peripheral portion is generally flat or planar, and central section 46b is formed with a raised or depressed contour that matches the confronting surfaces of the dam and weir. To ensure proper alignment of the central portion of the gasket with the dam and weir, a groove 47 is formed in the central section of the dam, and the central portion of the gasket is received in the groove.

A ferrule 48 extends from the outer side of base 41 for connection to an external fitting. The ferrule opens through the inner side of the base via a port 49 and communicates with chamber 27 when the converter is mounted on the valve body.

Bolt holes 51 are formed in the base in alignment with bolt holes 37 in the valve body, and the converter is secured to the valve body by bolts 52 and nuts 53. Alternatively, the holes in either the valve body or the converter can be threaded to receive the bolts, or threaded studs can extend from one of the pieces and pass through the holes in the other.

When the converter is mounted on the valve body in place of the actuator, the dam and weir block the flow between chambers 27 and 28, thereby isolating the two sections of piping connected to the valve body from each other and preventing flow between them. Ferrule 48 provides an access or connection point through which liquids and/or gases can be introduced into or removed from the section of piping connected to the side of the valve body on which the ferrule is located. It also provides a point of access or connection for instrumentation, monitoring equipment, and the like.

FIG. 6 illustrates the use of the converter in bypassing a section of piping in a system. In this embodiment, a first converter 39a is mounted on the body of an existing valve between piping sections 56, 57, and a second converter 39b is mounted on the body of an existing valve between piping sections 57, 58, with ferrules 48a, 48b communicating with pipe sections 56, 58. The dams on the converters and the weirs in the valve bodies isolate section 57 from the system, and a bypass line 59 is connected to the ferrules to bypass section 57 and provide communication between sections 56, 58.

In addition to simply bypassing a section, the converters can also be utilized in adding to or modifying an existing system. For that purpose, the converters are again installed at opposite ends of a section, with the ferrules communicating with the two sections which are adjacent to that section, and the additional or modified components are connected to the ferrules in place of the bypass line. In the embodiment illustrated in FIG. 7, the converter has a second ferrule 61 that extends from the outer side of base 41 and opens through the base via a second port 62 on the side of dam 43 opposite ferrule 48 to provide a point of access or connection to the second chamber 28 in the valve body. The ferrules extend from the base at a downward angle in order to promote drainage from the system. In the two lower corners, the ferrules block access to the mounting holes, and threaded studs 63 are utilized for securing the converter to the valve body in those locations. The studs are affixed to the base by suitable means such as threading or welding and extend rearwardly from the base in alignment with bolt holes in the valve body.

With the second port, a section of a piping system can be isolated and worked on while the remainder of the system remains on line and in operation. Thus, for example, FIG. 8 illustrates a system similar to the one shown in FIG. 6 but with two-port converters 39a, 39b mounted on the valve bodies between piping sections 56, 57 and 57, 58 and bypass line 59 connected between ferrules 48a, 48b to maintain communication and flow between sections 56, 58. In this embodiment, however, the additional ferrules 61a, 61b communicate with the two ends of section 57 and provide access or connection points through which cleaning fluids, passivating gases, and the like can be passed.

The two-port converter also makes it possible to divert the product flow and bring additional components into the system while tapping into the system at only one point. To do so, the converter is mounted on a valve body where the additional components are desired, with the dam and weir blocking flow through the valve body and the additional components connected in loop between the two ports. In this way, the product flow can receive additional processing such as filtration, mixing, heating or cooling, and inspection and testing.

Figure 9:
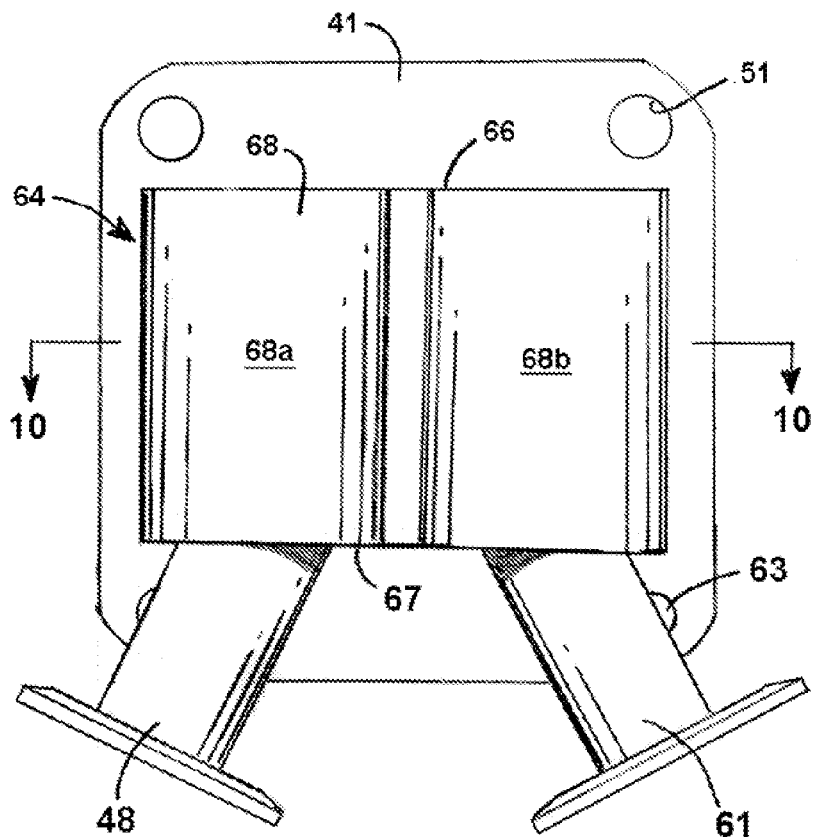
FIG. 9 is a front elevational view of another embodiment of a valve-to-fitting converter according to the invention.
Figure 10:
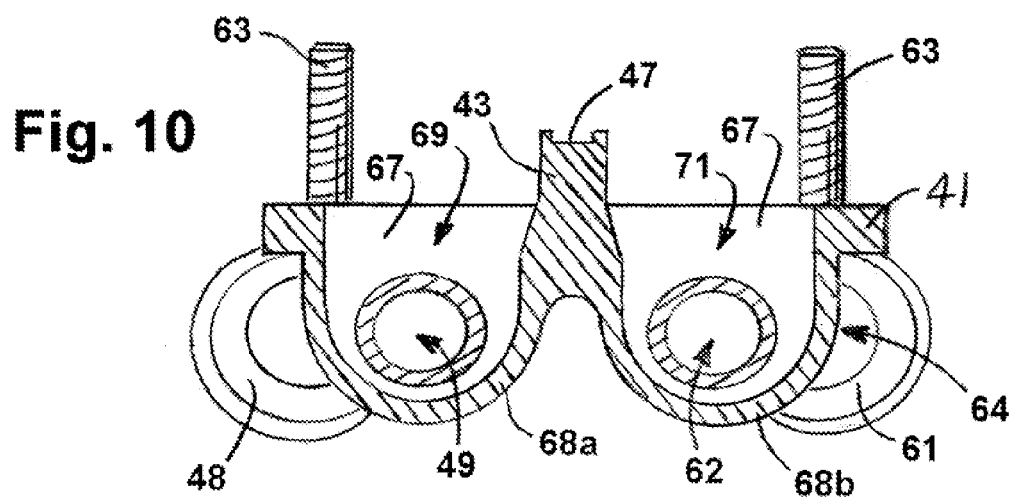
FIG. 10 is a cross-sectional view taken along line 10-10 in FIG. 9.

In the embodiment of FIGS. 9 and 10, a housing 64 projects from the outer or front side of base plate 41. The housing has a top wall 66, a bottom wall 67, and a front wall 68 with semi-cylindrical sections 68a, 68b in which chambers 69, 71 are formed. These chambers are separated from each other by dam 43 and are aligned with chambers 27, 28 when the converter is installed on the valve body. Ferrules 48, 61 extend in a downward direction from bottom wall, with ports 48, 62 opening through the bottom wall to provide communication between the ferrules and chambers. With the ports thus positioned in the lowermost portions of the chambers, liquid can drain completely out of the chambers and not become trapped in them, which is important in a sanitary system.

Figure 11:
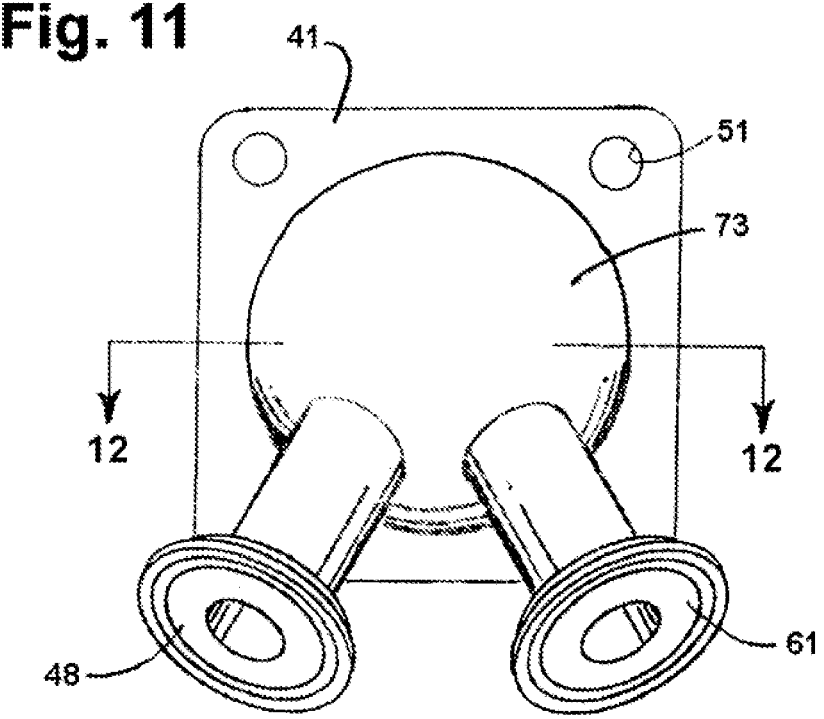
FIG. 11 is a front elevational view of another embodiment of a valve-to-fitting converter according to the invention.
Figure 12:
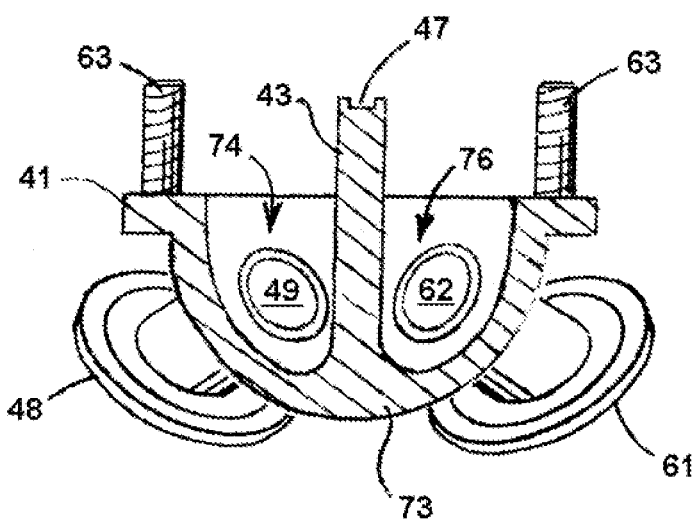
FIG. 12 is a cross-sectional view taken along line 12-12 in FIG. 11.

FIGS. 11 and 12 illustrate another embodiment in which chambers in the converter mate up with the chambers in the valve body and sanitary drainage is provided. In this embodiment, a hemispherical housing or dome 73 extends from the outer or front side of base 41, with chambers 74, 76 being formed within the housing and separated by dam 43. Ferrules 48, 61 extend downwardly and outwardly from dome 73, with ports 49, 62 being formed in the lowermost portions of the chambers.

Figure 13:
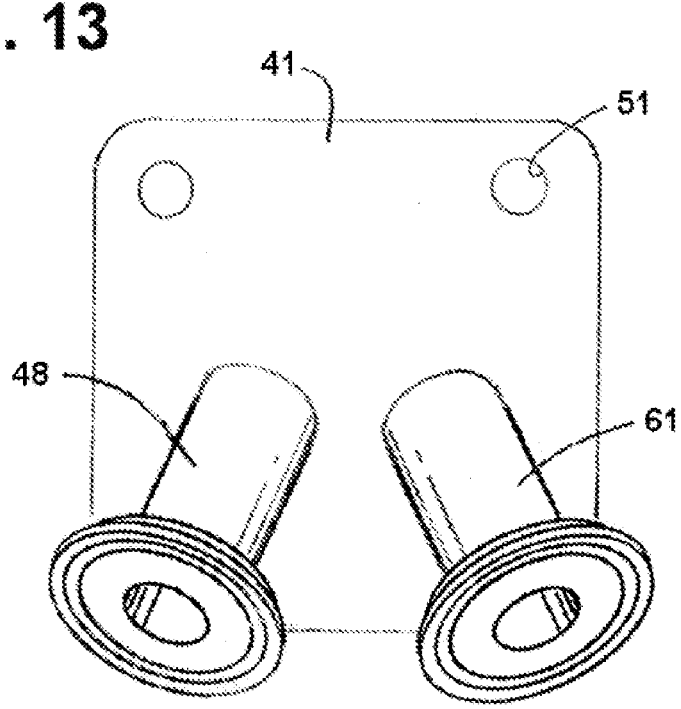
FIG. 13 is a front elevational view of another embodiment of a valve-to-fitting converter according to the invention.
Figure 14:
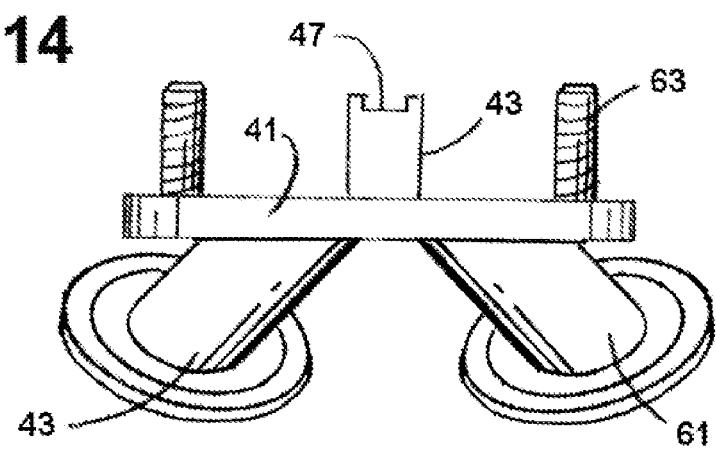
FIG. 14 is a top plan view of the embodiment of FIG. 13.

In the embodiment of FIGS. 13 and 14, ferrules 48, 61 extend downwardly and outwardly from base 41 and open through the base on opposite sides of dam 43 in a symmetrical manner. This embodiment is particularly suitable for use in horizontal runs of piping with both ferrules providing drainage from the chambers in the valve body and from the piping connected thereto.

Figure 15:
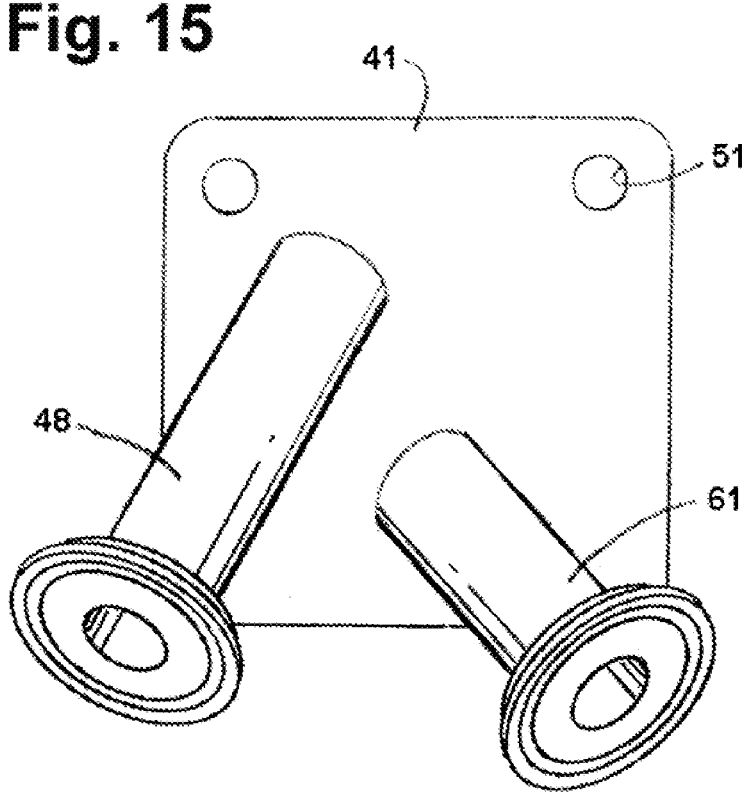
FIG. 15 is a front elevational view of another embodiment of a valve-to-fitting converter according to the invention.
Figure 16:
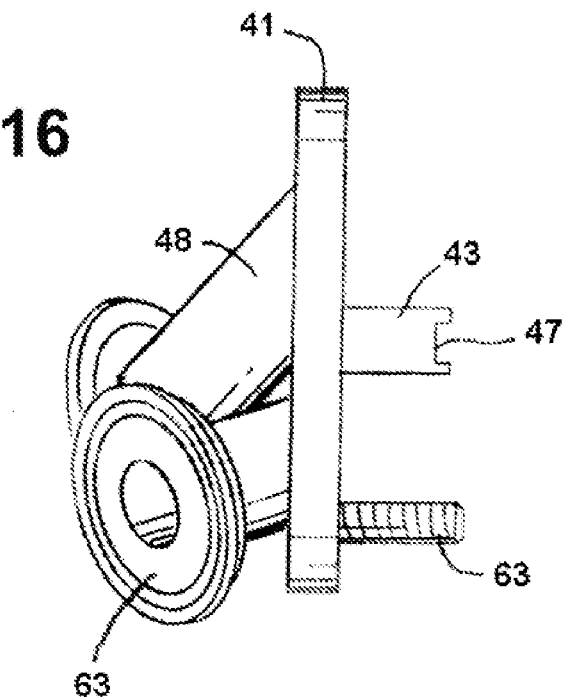
FIG. 16 is a side elevational view of the embodiment of FIG. 15.

FIGS. 15 and 16 illustrate an embodiment that is particularly suitable for in vertical runs of piping where the weir extends horizontally and the two chambers in the valve body are positioned one above the other. In this embodiment, dam 43 extends horizontally, ferrule 48 opens through base 41 above the dam, and ferrule 61 opens through the base below the dam. Both ferrules extend downwardly and outwardly from the base and, thus, provide drainage from the chambers in the valve body.

In all of the embodiments, the system only needs to be shut down briefly while the converter is being installed on the valve body and while fittings are being connected to and disconnected from the converter.

If desired, the dam can be omitted from the converter, and the converter can then be used to add access points to an existing system without otherwise changing or modifying the system.

Although the converter is particularly suitable for use in sanitary process piping systems, it can be used in any piping system that has a weir-diaphragm valve, and both the piping system and the converter can be made of any suitable material or materials, including plastics. Thus, for example, it can be used in water and acid systems.

The converter can also be utilized effectively in conjunction with large complex piping systems with transfer panels where different sections of piping can be selectively connected together by U-shaped couplings that are commonly known as jumpers. Once a system has been configured, passivation of the entire system may be required, and this can be a time consuming and costly process in a large system. The passivation can be greatly simplified by using a valve-to-fitting converter at a valve near the panel so that it is only necessary to passivate the portion of the system between the panel and the valve.

The invention has a number of important features and advantages. The converter is readily installed on existing valves in a piping system, and it allows sections of the system to be isolated and/or re-routed without shutting down the entire system or taking the entire system off line for an extended period of time.

It is apparent from the foregoing that a new and improved valve-to-fitting converter has been provided. While only certain presently preferred embodiments have been described in detail, as will be apparent to those familiar with the art, certain changes and modifications can be made without departing from the scope of the invention as defined by the following claims.

The invention claimed is:

1. A valve-to-fitting converter for use on a valve body having a mounting surface on which a valve actuator is normally mounted, first and second chambers opening through the mounting surface, ports communicating with the chambers, and a weir at least partially separating the chambers, the converter comprising: a base that mounts on the valve body in place of the valve actuator, a dam that extends from the base and mates with the weir to block communication between the chambers, and a port that provides communication between one of the chambers and a fitting connected to the converter.

2. The valve-to-fitting converter of claim 1 including a second port that provides communication between the other chamber and a second fitting connected to the converter.

3. The valve-to-fitting converter of claim 1 including a gasket that is disposed between the base and the mounting surface and includes a bridge portion that engages confronting surfaces of the dam and the weir to form a seal between the dam and the weir.

4. The valve-to-fitting converter of claim 3 wherein the surface of the dam has a groove in which the bridge portion of the gasket is received.

5. The valve-to-fitting converter of claim 3 wherein the confronting surfaces of the weir and the dam have mating concave and convex contours, and the bridge portion of the gasket is formed with the same contour as the confronting surfaces of the dam and the weir.

6. The valve-to-fitting converter of claim 1 wherein the base has a generally planar surface which faces the mounting surface of the valve body and the dam extends from the generally planar surface.

7. The valve-to-fitting converter of claim 1 including chambers in the converter that match up with the chambers in the valve body and are separated by the dam.

8. The valve-to-fitting converter of claim 7 wherein the chambers in the converter are formed in a housing that extends from a side of the base opposite the valve body.

9. The valve-to-fitting converter of claim 8 wherein fittings communicate with the chambers through ports formed in lowermost portions of the housing.

10. The valve-to-fitting converter of claim 9 wherein the ports open into ferrules which extend in downward directions from the housing.

11. In a piping system with sections of piping separated by flow control valves having bodies connected to the piping, chambers within the bodies communicating with the sections of piping between which the valves are connected, weirs separating the chambers, and actuators removably mounted on the valve bodies: a valve-to-fitting converter mounted on one of the valve bodies in place of an actuator, the converter having a dam that cooperates with the weir in the valve body to block flow between the sections of piping connected thereto, and a port providing communication between one of the chambers and a fitting connected to the converter.

12. The valve-to-fitting converter of claim 11 including a second port that provides communication between the other chamber and a second fitting connected to the converter.

13. The valve-to-fitting converter of claim 11 wherein the converter includes chambers which are separated by the dam and are in direct communication with the chambers in the valve body, with the port opening into the lowermost part of the chambers on one side of the weir and dam so that liquid can drain completely out of those chambers and not become trapped in any part of them.

14. In a sanitary process piping system in which sections of piping between existing valves can be isolated or re-routed: valve-to-fitting converters mounted on the bodies of two of the existing valves in place of actuators that are normally mounted there, with each of the converters blocking flow between sections of piping connected to the valve body on which the converter is mounted, and ports in the converters providing communication between the sections of piping connected to the valve bodies and external fittings connected to the converters.

15. The valve-to-fitting converters of claim 14 including dams that mate with weirs in the valve bodies to block the flow between the sections of piping connected to each of the valve bodies.

16. The valve-to-fitting converters of claim 15 including chambers in the converters on opposite sides of the dams in direct communication with the chambers in the valve bodies, with the ports opening into the lowermost parts of the chambers in the converters so that liquid can drain completely out of the chambers and not become trapped in any part of them.

17. The valve-to-fitting converters of claim 15 with sealing gaskets disposed between confronting surfaces of the dams and the weirs.

18. The valve-to-fitting converters of claim 15 wherein the dams and the weirs have mating contoured surfaces, and the gaskets are formed with a contour corresponding to the surfaces of the dams and the weirs.

19. A valve-to-fitting converter for use with a valve body having a mounting surface on which a valve actuator is normally mounted, first and second chambers opening through the mounting surface, ports communicating with the chambers, and a weir at least partially separating the chambers, the converter comprising: a base that mounts on the valve body in place of the valve actuator, and a port that provides communication between one of the chambers and a fitting connected to the converter.

20. The valve-to-fitting converter of claim 19 including a second port that provides communication between the other chamber and a second fitting connected to the converter.

* * * * *